United States Patent [19]
Yoshida et al.

[11] Patent Number: 6,099,159
[45] Date of Patent: Aug. 8, 2000

[54] CONTINUOUS MIXING FEEDER

[75] Inventors: Minoru Yoshida; Hideki Mizuguchi; Kunihiro Horie, all of Hiroshima, Japan

[73] Assignee: The Japan Steel Works, Ltd., Tokyo, Japan

[21] Appl. No.: 09/393,808

[22] Filed: Sep. 10, 1999

[51] Int. Cl.[7] .............................. B01F 7/08; B01F 15/20
[52] U.S. Cl. ........................ 366/156.1; 366/319; 366/320
[58] Field of Search ............................ 366/64, 67, 76.3, 366/96–99, 102, 154.1, 155.1, 155.2, 156.1, 158.3, 168.1, 172.1, 172.2, 186, 194–196, 318–320, 322

[56] References Cited

U.S. PATENT DOCUMENTS

| | | |
|---|---|---|
| 934,603 | 9/1909 | Gedge . |
| 2,509,543 | 5/1950 | Truax . |
| 2,538,891 | 1/1951 | Zimmerman et al. . |
| 3,130,070 | 4/1964 | Potters et al. . |
| 4,223,996 | 9/1980 | Mathis et al. ............................ 366/319 |
| 5,358,331 | 10/1994 | Cruse ...................................... 366/320 |

FOREIGN PATENT DOCUMENTS

| | | | |
|---|---|---|---|
| 402706 | 5/1966 | Switzerland ............................ 366/319 |

*Primary Examiner*—Charles E. Cooley
*Attorney, Agent, or Firm*—Sughrue, Mion, Zinn, Macpeak & Seas, PLLC

[57] ABSTRACT

The invention is for mixing at least one kind of an additive with a powdery or granular main material homogeneously so as to continuously supply the same quantitatively. A barrel comprises a front side cylindrical part, a trough part, and a rear side cylindrical part from the upstream side. A quantitative extruding zone comprises the front side cylindrical part and a quantitative extruding part having a full flight provided on the peripheral surface of the axis part of a screw, for quantitatively transporting a main material to the downstream side. A mixing zone comprises the trough part and a mixing part having an agitating blade formed zigzag on the axis part of the screw and a ribbon screw having a distance with respect to the peripheral surface of the axis part, for homogeneously dispersing additives added from additive supply openings in the main material. The scraping out zone comprises the rear side cylindrical part and a scraping out part having forward paddles and backward paddles formed alternately on the peripheral surface of the axis part of the screw, for discharging the mixture from a discharge opening.

2 Claims, 2 Drawing Sheets

CONTINUOUS MIXING FEEDER

BACKGROUND OF THE INVENTION

1. Field of Invention

The present invention relates to a continuous mixing feeder, capable of adding and mixing at least one kind of an additive with a powdery or granular main material, and continuously supplying the same to the next step quantitatively.

2. Related Art

When a powdery or granular main material is needed to be supplied with at least one kind of an additive added thereto, to a supply portion of an extruder or an injection molding machine, a method (A) or a method (B) mentioned below is adopted on the whole.

(A) A method of supplying a main material and an additive by a screw type feeder to a supply portion of an extruder or an injection molding machine.

(B) A method of mixing a main material and at least one kind of an additive by a batch type mixer and storing the same in a storage tank, and supplying the mixture stored in the storage tank to a supply portion of an extruder or an injection molding machine via a transport pipe.

Among the above-mentioned conventional techniques, the method (A) involves a problem in that the quality of the molded products can be irregular due to difficulty in homogeneously dispersing an additive in a powdery or granular main material when it is used as means for supply to an extruder or an injection molding machine.

Further, the method (B) involves a problem in change of the mixing ratio of an additive to a main material due to adherence of the mixture to a transport pipe when an adherent material is included, or unevenness of the material due to separation during passage in a transport pipe when materials with a large specific gravity difference are included.

SUMMARY OF THE INVENTION

In view of the above-mentioned problems in the conventional techniques, an object of the invention is to provide a continuous mixing feeder, capable of adding and mixing at least one kind of an additive with a powdery or granular main material, and continuously supplying the same quantitatively.

In order to achieve the above-mentioned object, a continuous mixing feeder of the invention comprises a barrel, a screw provided rotatably in the barrel, and rotation drive means for rotating the screw, with a quantitative extruding zone, a mixing zone, and a scraping out zone formed from the upstream side by changing the shape of the barrel and the screw, wherein the quantitative extruding zone comprises a front side cylindrical part having a supply opening for supplying a main material on the upstream end side of the barrel and a quantitative extruding part having a full flight provided on the peripheral surface of the axis part of the screw, the mixing zone comprises a trough part with a substantially U-shaped cross-section, having at least one additive supply opening on the upstream end side of the trough part and a mixing part having a plurality plate-like agitating blades projecting in the radial direction formed zigzag with a distance between each other along the axial direction on the peripheral surface of the axis part of the screw and a ribbon screw supported by the agitating blade scraped a distance with respect to the peripheral surface of the axis part, and the scraping out zone comprises a rear side cylindrical part having a discharge opening for discharging a mixture from the scraping out zone on the downstream end side of the barrel and a scraping out part having a scraping agitating blade on the peripheral surface of the axis part of the screw.

Moreover, the scraping out part having the scraping agitating blade on the peripheral surface of the axis part of the screw can be detachably provided so as to be replaced by another scraping out part having a scraping agitating blade with a different shape on the peripheral surface of the axis part of the screw.

DETAILED DESCRIPTION OF PREFERRED EMBODIMENT

An embodiment of a continuous mixing feeder according to the invention will be explained based on drawings.

Figure 1:
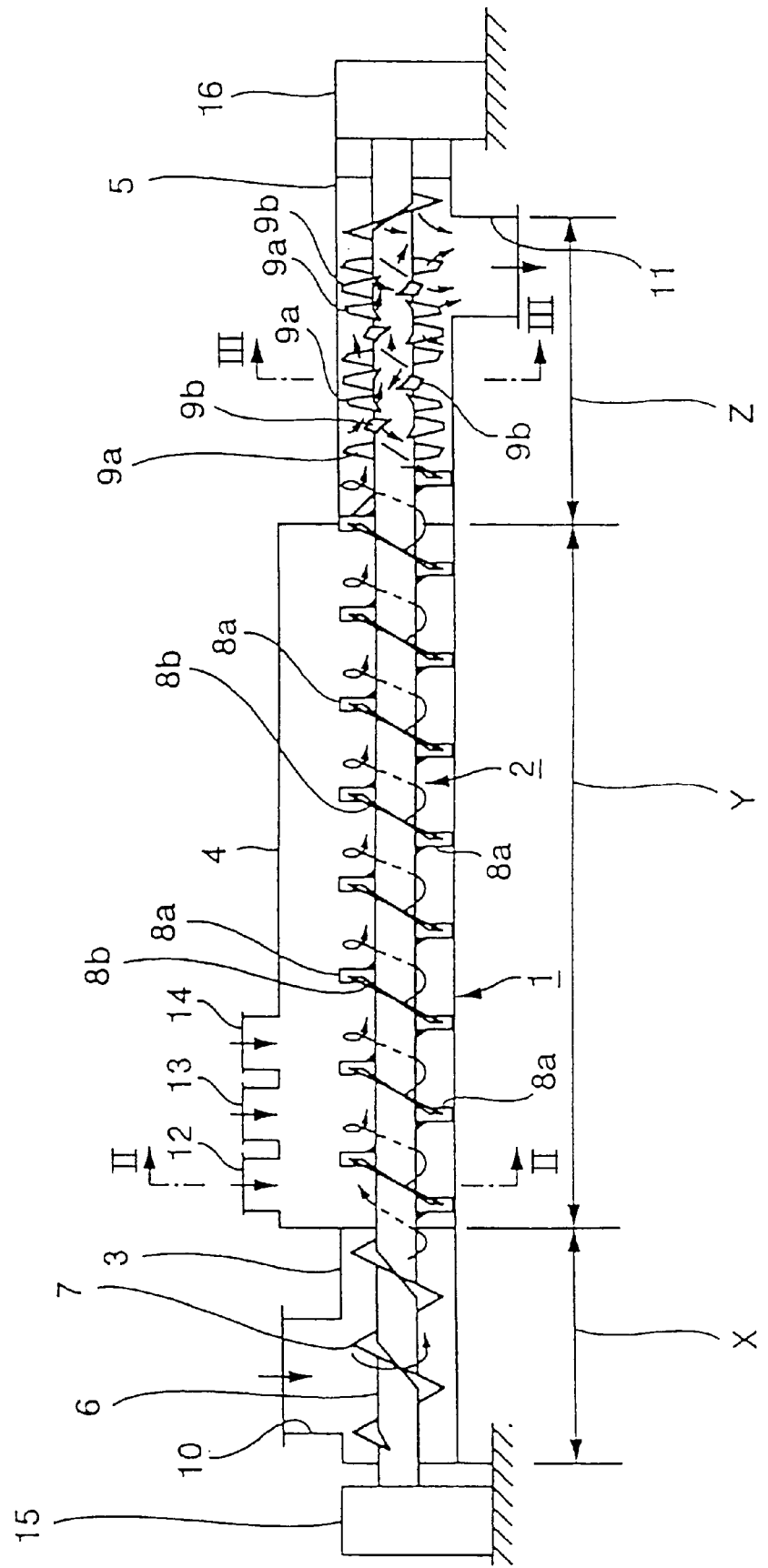
FIG. 1 is a diagram for explaining a continuous mixing feeder according to one embodiment.

As shown in FIG. 1, the continuous mixing feeder comprises a barrel 1, a screw 2 provided rotatably in the barrel 1, and rotation drive means 15 for rotating the screw 2, with a quantitative extruding zone X, a mixing zone Y, and a scraping out zone Z formed successively from the upstream side by changing the shape of the barrel 1 and the screw 2 as described later.

The quantitative extruding zone X comprises a front side cylindrical part 3 in the barrel 1, and a quantitative extruding part having a full flight 7 provided on the peripheral surface of the axis part 6 of the screw 2 such that a main material supplied from a supply opening 10 provided on the upstream end side of the cylindrical part 3 is transported quantitatively to the mixing zone Y.

The tip part projecting outward from a rear side cylindrical part 5 of the screw 2 is supported rotatably by a supporting part 16 via a bearing (not illustrated).

The mixing zone Y comprises a trough part 4 having a substantially U-shaped cross-section in the barrel 1, and a mixing part having a plurality of plate-like agitating blades 8a projecting in the radial direction formed zigzag with a distance between each other along the axial direction on the peripheral surface of the axis part 6 of the screw 2 provided in the trough part 4 and a ribbon screw 8b supported by the agitating blade 8a spaced at distance with respect to the peripheral surface of the axis part 6 such that a main material quantitatively transported from the quantitative extruding zone X and additives supplied each from a first additive supply opening 12, a second additive supply opening 13 and a third additive supply opening 14 provided with a distance between each other in the axial direction on the upstream end side of the trough part 4 of the barrel 1 are mixed so as to provide a mixture, wherein the additives are dispersed homogeneously in the main material, to the scraping out zone Z.

The number of the additive supply openings is not limited to three, but an optional number can be adopted as needed.

The scraping out zone Z comprises a rear side cylindrical part 5 in the barrel 1, and a scraping out part having clover-like forward paddles 9a and backward paddles 9b formed alternately with a distance between each other in the axial direction on the peripheral surface of the axis part 6 of the screw 2 provided in the rear side cylindrical part 5 such that the mixture transported from the mixing zone Y is further mixed and scraped out from a discharge opening 11 provided on the downstream end side of the rear side cylindrical part 5.

In this embodiment, the forward paddles 9a are formed with a tilt angle with respect to the axial direction such that a mixture can be transported to the downstream side, and the backward paddles 9b are formed with a tilt angle with respect to the axial direction such that the mixture can be forced back to the upstream side.

Operation of the continuous mixing feeder of this embodiment will be explained.

(1) A powdery or granular main material supplied to the quantitative extruding zone X via the supply opening 10 is transported quantitatively to the mixing zone Y by the quantitative extruding part, wherein the full flight 7 is provided on the peripheral surface of the axis part 6 of the screw 2 provided in the front side cylindrical part 3 of the barrel 1.

(2) The powdery or granular main material quantitatively transported to the mixing zone Y by the step (1) is mixed with a predetermined amount of each a first additive, a second additive, and a third additive supplied from the first additive supply opening 12, the second additive supply opening 13, and the third additive supply opening 14 by the agitating blades 8a and the ribbon screw 8b so as to be a mixture with the additives dispersed homogeneously and transported to the scraping out zone Z.

Figure 2:
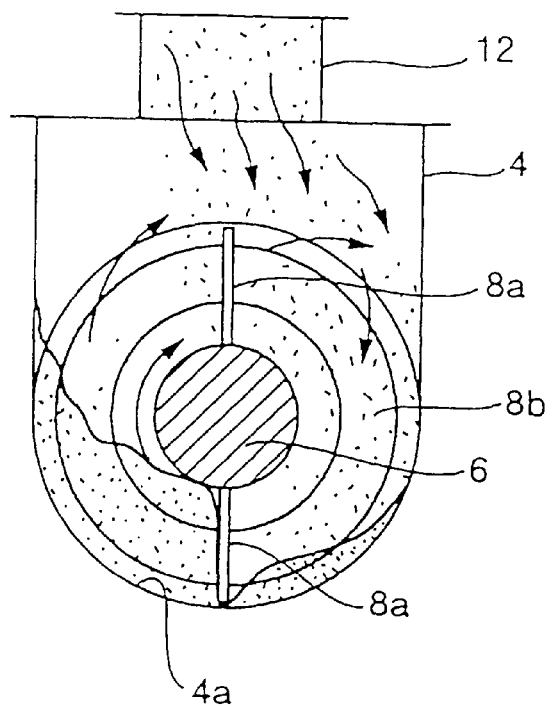
FIG. 2 is a schematic cross-sectional view taken on the line II—II of FIG. 1.
Figure 3:
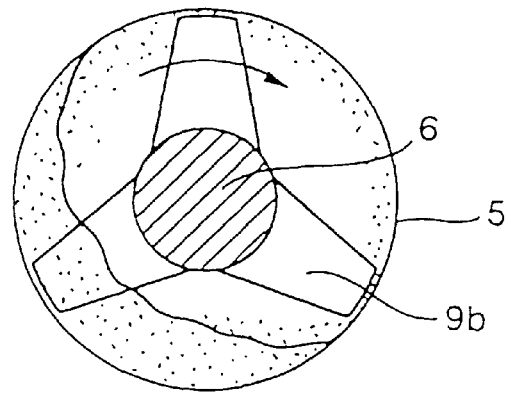
FIG. 3 is a schematic cross-sectional view taken on the line III—III of FIG. 1.

In this step, the mixture to be transported in the trough part 4 with a substantially U-shaped cross-section, is scraped upward from the trough bottom surface 4a of the trough part 4 with a substantially U-shaped cross-section many times as shown in FIG. 2 so as to be mixed while floating and turning round by the interaction of the agitating blades 8a and the ribbon screw 8b, and is transported to the downstream side without stagnating the main material or the additives on the trough bottom surface 4a. As a result, a mixture with the additives dispersed in the main material can be transported to the scraping out zone Z.

(3) After the step (2), the mixture is transported to the downstream side and forced back to the upstream side alternately by the forward paddles 9a and the backward paddles 9b in the scraping out zone Z. As a result, the mixture with the filling ratio heightened and the additives homogeneously dispersed in the main material can be discharged outside the apparatus continuously from the discharge opening 11.

The scraping out part having a scraping agitating blade on the peripheral surface of the axis part 6 of the screw 2 according to the invention is not limited to the scraping out part having the clover-like forward paddles 9a and backward paddles 9b formed alternately with a distance with each other in the axial direction on the peripheral surface of the axis part 6 described in this embodiment, but scraping out parts provided with a full flight on the peripheral surface of the axis part, or provided with a scraping agitating blade with another shape, such as a ribbon screw, can be adopted as well.

Moreover, the scraping out part can be detachably provided via a coupling at the boundary part with the mixing part of the screw 2 so as to be replaced by another scraping out part having a full flight or a scraping agitating blade with a different shape, such as a ribbon screw on the peripheral surface of the axis part. Accordingly, main materials and/or additives with different physical properties can be handled with one continuous mixing feeder.

According to the configurations, the invention can achieve the following effects.

A main material transported quantitatively from the quantitative extruding zone and added additives are mixed while floating and turning round many times in the mixing zone so as to be a mixture dispersed and mixed homogeneously. The mixture is discharged continuously from the discharge opening via the scraping out zone without stagnating in the barrel. As a result, a mixture with additives homogeneously dispersed in a main material can be supplied continuously and stably to the supply part of the next step.

What is claimed is:

1. A continuous mixing feeder comprising:

a barrel;

a screw provided rotatably in the barrel, said screw including an axis part;

rotation drive means for rotating the screw;

a quantitative extruding zone including a front side cylindrical part having a supply opening for supplying a main material on the upstream end side of the barrel and an extruding part having a full flight provided on the peripheral surface of the axis part of the screw;

a mixing zone including a trough part with a substantially U-shaped cross-section, having at least one additive supply opening on the upstream end side of the trough part, and a mixing part having a plurality of plate-like agitating blades projecting in the radial direction formed zigzag with a distance between each other along the axial direction on the peripheral surface of the axis part of the screw, and a ribbon screw supported by the agitating blades and spaced a distance with respect to the peripheral surface of the axis part; and a scraping out zone including a rear side cylindrical part having a discharge opening for discharging a mixture from the scraping out zone on the downstream end side of the barrel, and a scraping out part having a scraping agitating blade on the peripheral surface of the axis part of the screw, wherein said extruding zone, said mixing zone, and said scraping out zone are formed in order from the upstream side of the barrel and the screw.

2. The continuous mixing feeder according to claim 1, wherein the scraping out part having the scraping agitating blade on the peripheral surface of the axis part of the screw is detachably connected to said mixing part so as to be replaceable by another scraping out part having a scraping agitating blade with a different shape on the peripheral surface of the axis part of the screw.

* * * * *